(12) United States Patent
Wu et al.

(10) Patent No.: US 11,579,737 B2
(45) Date of Patent: Feb. 14, 2023

(54) TOUCH SUBSTRATE AND TOUCH DISPLAY DEVICE

(71) Applicants: Chengdu BOE Optoelectronics Technology Co., Ltd., Chengdu (CN); BOE Technology Group Co., Ltd., Beijing (CN)

(72) Inventors: Jianjun Wu, Beijing (CN); Chuanyan Lan, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/487,251

(22) Filed: Sep. 28, 2021

(65) Prior Publication Data
US 2022/0171497 A1    Jun. 2, 2022

(30) Foreign Application Priority Data

Nov. 30, 2020   (CN) .......................... 202011374586.X

(51) Int. Cl.
*G06F 3/044*      (2006.01)
*G06F 3/041*      (2006.01)
(52) U.S. Cl.
CPC .......... *G06F 3/0446* (2019.05); *G06F 3/0412* (2013.01); *G06F 2203/04111* (2013.01)

(58) Field of Classification Search
CPC .... G06F 3/0412; G06F 3/0446; G06F 3/0443; G06F 3/04164; G06F 2203/04111; G06F 2203/04107
See application file for complete search history.

(56) References Cited

U.S. PATENT DOCUMENTS

2020/0249053 A1* 8/2020 Murata ................... G06F 3/044

\* cited by examiner

*Primary Examiner* — Deeprose Subedi
(74) *Attorney, Agent, or Firm* — Westman, Champlin & Koehler, P.A.

(57) ABSTRACT

A touch substrate, including: a base substrate; a plurality of touch electrodes arranged in a touch area on the base substrate; a plurality of touch signal lines, a ground line, an antistatic member and an electrostatic protection component arranged in a peripheral area on the base substrate, the plurality of touch signal lines are respectively electrically connected to the plurality of touch electrodes, the ground line is located on a side of the plurality of touch signal lines away from the touch area, the antistatic member is located on a side of the ground line away from the touch area, an end of the electrostatic protection component away from the touch area is in contact with the antistatic member, and an orthographic projection of the electrostatic protection component on the base substrate covers an orthographic projection of each of the antistatic member and the ground line on the base substrate.

20 Claims, 7 Drawing Sheets

TOUCH SUBSTRATE AND TOUCH DISPLAY DEVICE

CROSS REFERENCE

This application claims the benefit of Chinese Patent Application No. 202011374586.X filed on Nov. 30, 2020, in the State Intellectual Property Office of China, the whole disclosure of which is incorporated herein by reference.

TECHNICAL FIELD

The present disclosure relates to a field of display technology, and in particular to a touch substrate and a touch display device.

BACKGROUND

In a touch panel, a touch position is detected by intersecting transmitting (Tx) electrodes and receiving (Rx) electrodes in mutually orthogonal directions on a panel. With the development trend of narrow bezels of electronic apparatus, bezel sizes of touch display devices are also continuously reducing, which results in weakening of their antistatic ability.

SUMMARY

In order to solve at least one aspect of the above mentioned problems, the embodiments of the present disclosure provide a touch substrate and a touch display device.

In one aspect, a touch substrate is provided, wherein the touch substrate includes: a base substrate including a touch area and a peripheral area surrounding the touch area; a plurality of touch electrodes arranged in the touch area on the base substrate; a plurality of touch signal lines arranged in the peripheral area on the base substrate, the plurality of touch signal lines are respectively electrically connected to the plurality of touch electrodes; a ground line arranged in the peripheral area on the base substrate, the ground line is located on a side of the plurality of touch signal lines away from the touch area; an antistatic member arranged in the peripheral area on the base substrate, the antistatic member is located on a side of the ground line away from the touch area; and an electrostatic protection component arranged in the peripheral area on the base substrate, wherein an end of the electrostatic protection component away from the touch area is in contact with the antistatic member, and an orthographic projection of the electrostatic protection component on the base substrate covers an orthographic projection of each of the antistatic member and the ground line on the base substrate.

According to some exemplary embodiments, the orthographic projection of the electrostatic protection component on the base substrate further covers an orthographic projection of at least a part of the plurality of touch signal lines on the base substrate.

According to some exemplary embodiments, an insulating layer is arranged between the electrostatic protection component and each of the ground line and the plurality of touch signal lines.

According to some exemplary embodiments, the ground line and the antistatic member contain a same material and are located in a same layer, and the ground line and the antistatic member are arranged at an interval.

According to some exemplary embodiments, the antistatic member includes a member body and at least one electrostatic discharge portion, the electrostatic discharge portion extends from the member body toward the ground line, an end of the electrostatic discharge portion facing the ground line is a tip, and the tip and the ground line are arranged at an interval.

According to some exemplary embodiments, the ground line includes a first portion and a second portion, a width of the first portion is greater than a width of the second portion; and the at least one electrostatic discharge portion is arranged opposite to the first portion of the ground line.

According to some exemplary embodiments, the ground line and the plurality of touch signal lines contain a same material and are located in a same layer, and the ground line and the plurality of touch signal lines are arranged at an interval.

According to some exemplary embodiments, the touch substrate includes a first insulating layer, the first insulating layer is located between a layer where the plurality of touch signal lines are located and a layer where the plurality of touch electrodes are located; wherein the plurality of touch signal lines includes a first touch signal line closest to the touch area, and the touch electrode is electrically connected to the first touch signal line through a via hole penetrating the first insulating layer; and wherein the orthographic projection of the electrostatic protection component on the base substrate and an orthographic projection of the first touch signal line on the base substrate are arranged at an interval.

According to some exemplary embodiments, the plurality of touch electrodes includes a plurality of first touch electrodes and a plurality of second touch electrodes, the first touch electrode includes: a plurality of first electrode units arranged in a first direction, and a bridge portion connected between every two adjacent first electrode units; a second touch electrode includes: a plurality of second electrode units arranged in a second direction, and a connecting portion connected between every two adjacent second electrode units, wherein the first direction and the second direction intersect, and the first electrode units, the second electrode units and the connecting portions are located in a same layer.

According to some exemplary embodiments, the bridge portion is located on a side of a layer where the first electrode units are located close to the base substrate; and the electrostatic protection component and the plurality of first touch electrodes contain a same material and are located in a same layer, and an end of the electrostatic protection component close to the first touch electrodes and a first touch electrode closest to the peripheral area are arranged at an interval.

According to some exemplary embodiments, the bridge portion is located on a side of a layer where the first electrode units are located away from the base substrate; and the electrostatic protection component and the bridge portion contain a same material and are located in a same layer, and an end of the electrostatic protection component close to the bridge portion and a bridge portion closest to the peripheral area are arranged at an interval.

According to some exemplary embodiments, the electrostatic protection component includes a first protection portion, a second protection portion and a third protection portion, an orthographic projection of the first protection portion on the base substrate covers an orthographic projection of the antistatic member on the base substrate, an orthographic projection of the second protection portion on the base substrate covers the orthographic projection of the ground line on the base substrate, and the third protection portion is configured to connect the first protection portion with the second protection portion; and wherein the base substrate includes a first surface facing the ground line, a vertical distance between a surface of the first protection portion close to the base substrate and the first surface is less than a vertical distance between a surface of the second protection portion close to the base substrate and the first surface, and the third protection portion extends obliquely with respect to the first surface.

According to some exemplary embodiments, the touch substrate further includes a second insulating layer on a side of the electrostatic protection component away from the base substrate, the second insulating layer and the base substrate surround to form an accommodating space, and each of the electrostatic protection component, the antistatic member and the ground line is located in the accommodation space.

According to some exemplary embodiments, a minimum interval distance between the tip and the ground line is greater than 5 microns; or a minimum distance between an end of the electrostatic protection component close to a first touch electrode and the first touch electrode is greater than 20 microns.

According to some exemplary embodiments, the ground line and the antistatic member contain a metal material; or the electrostatic protection component contains a transparent conductive material.

According to some exemplary embodiments, the antistatic member forms a semi-closed structure surrounding the touch area; or the ground line forms a semi-closed structure surrounding the touch area.

According to some exemplary embodiments, the antistatic member is configured to load a ground signal or be suspended; or the ground line is configured to load a ground signal.

In another aspect, a touch display device is provided, including the touch substrate described above.

BRIEF DESCRIPTION OF THE DRAWINGS

Through the following description of the present disclosure with reference to the drawings, other purposes and advantages of the present disclosure will become apparent and may help a comprehensive understanding of the present disclosure.

Figure 1:
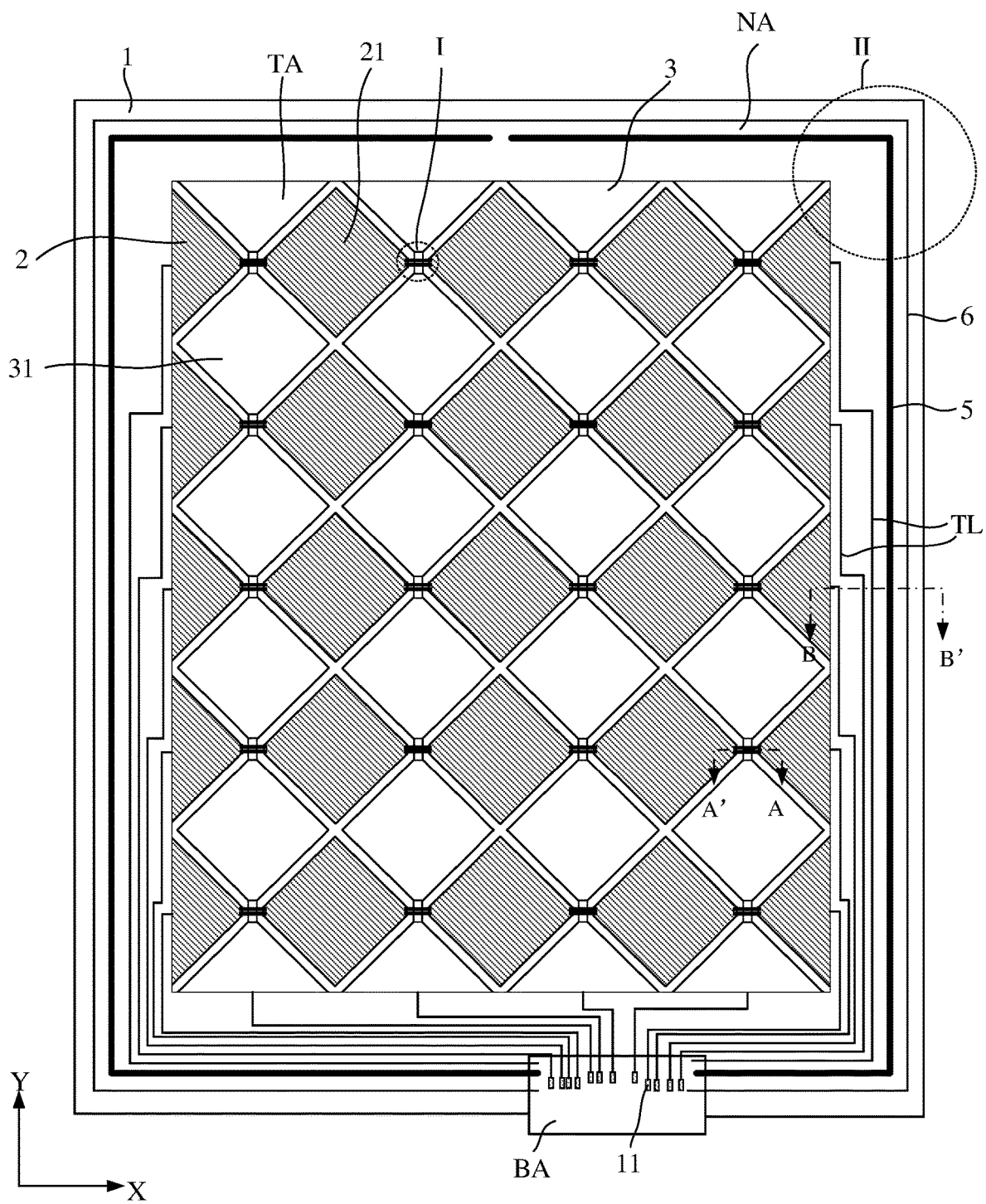
FIG. 1 is a plan view of a touch substrate according to some embodiments of the present disclosure.

It should be noted that, for clarity, in the drawings used to describe the embodiments of the present disclosure, sizes of layers, structures, or regions may be enlarged or reduced, that is, these drawings are not drawn according to actual scale.

DETAILED DESCRIPTION OF EMBODIMENTS

In the following, the technical solutions of the present disclosure will be further described in detail through the embodiments and in conjunction with the drawings. In the specification, the same or similar reference numerals indicate the same or similar components. The following description of the embodiments of the present disclosure with reference to the drawings is intended to explain the general inventive concept of the present disclosure, and should not be construed as a limitation to the present disclosure.

In addition, in the following detailed description, for ease of explanation, many specific details are set forth to provide a comprehensive understanding of the embodiments of the present disclosure. However, obviously, one or more embodiments may also be implemented without these specific details.

It should be noted that "on", "formed on" and "disposed on" in the present disclosure may mean that a layer is directly formed or disposed on another layer, or may mean a layer is indirectly formed or disposed on another layer, that is, there may be other layers between the two layers.

It should be noted that although terms "first", "second", etc. may be used herein to describe various components, members, elements, regions, layers and/or parts, these components, members, elements, regions, and layers and/or part should not be limited by these terms. Rather, these terms are used to distinguish one component, member, element, region, layer, and/or part from another. Thus, for example, a first component, a first member, a first element, a first region, a first layer and/or a first part discussed below may be referred to as a second component, a second member, a second element, a second region, a second layer and/or a second part without departing from the teachings of the present disclosure.

When a component (such as a first component) is connected or electrically connected to another component (such as a second component), it should be understood that the component is directly connected or electrically connected to the another component, or connected or electrically connected to the another component through any other component (such as a third component). On the other hand, when a component (such as a first component) is described as being "directly connected to", "directly coupled to" or "directly electrically connected to" another component (such as a second component), it should be understood that there is no other component (such as a third component) between the components.

In the present disclosure, a XYZ coordinate system is used to describe the relative positional relationship between various features in the embodiments of the present disclosure. It should be understood that X axis, Y axis, and Z axis are not limited to the three axes of the Cartesian coordinate system, and may be interpreted in a broader meaning. For example, the X axis, the Y axis, and the Z axis may be perpendicular to each other, or may represent different directions that are not perpendicular to each other. For the purpose of the present disclosure, "at least one of X, Y, and Z" and "at least one selected from the group consisting of X, Y, and Z" may be interpreted as only X, only Y, only Z, or any combination of two or more of X, Y, and Z such as XYZ, XY, YZ and XZ.

It should be noted that, in the present disclosure, "Thickness" refers to a size along a light emitting direction of a display substrate or a display panel. "Width" refers to a size in a direction perpendicular to a light emitting direction of a display substrate or a display panel and parallel to a row direction of a pixel array on the display panel (i.e, the X direction shown in the drawings).

In the present disclosure, unless otherwise specified, the term "same layer" refers to that two layers, components, members, elements or parts may be formed by a same patterning process, and the two layers, components, members, elements or parts are generally formed of a same material.

In the present disclosure, unless otherwise specified, the expression "patterning process" generally includes steps of photoresist coating, exposure, development, etching, and photoresist stripping, etc. The expression "one patterning process" refers to a process of forming patterned layers, components, members, etc., by using one mask.

The embodiments of the present disclosure provide a touch substrate and a touch display device. The touch substrate includes: a base substrate, the base substrate includes a touch area and a peripheral area surrounding the touch area; a plurality of touch electrodes arranged in the touch area on the base substrate; a plurality of touch signal lines arranged in the peripheral area on the base substrate, the plurality of touch signal lines are respectively electrically connected to the plurality of touch electrodes; a ground line arranged in the peripheral area on the base substrate, the ground line is located on a side of the plurality of touch signal lines away from the touch area; an antistatic member arranged in the peripheral area on the base substrate, the antistatic member is located on a side of the ground line away from the touch area; and an electrostatic protection component arranged in the peripheral area on the base substrate, an end of the electrostatic protection component away from the touch area is in contact with the antistatic member, and an orthographic projection of the electrostatic protection component on the base substrate covers an orthographic projection of each of the antistatic member and the ground line on the base substrate. In this way, it may be ensured that static electricity will not be released to internal signal lines such as the touch signal lines, so that an influence of static electricity on normal touch or display functions may be avoided.

Figure 2:
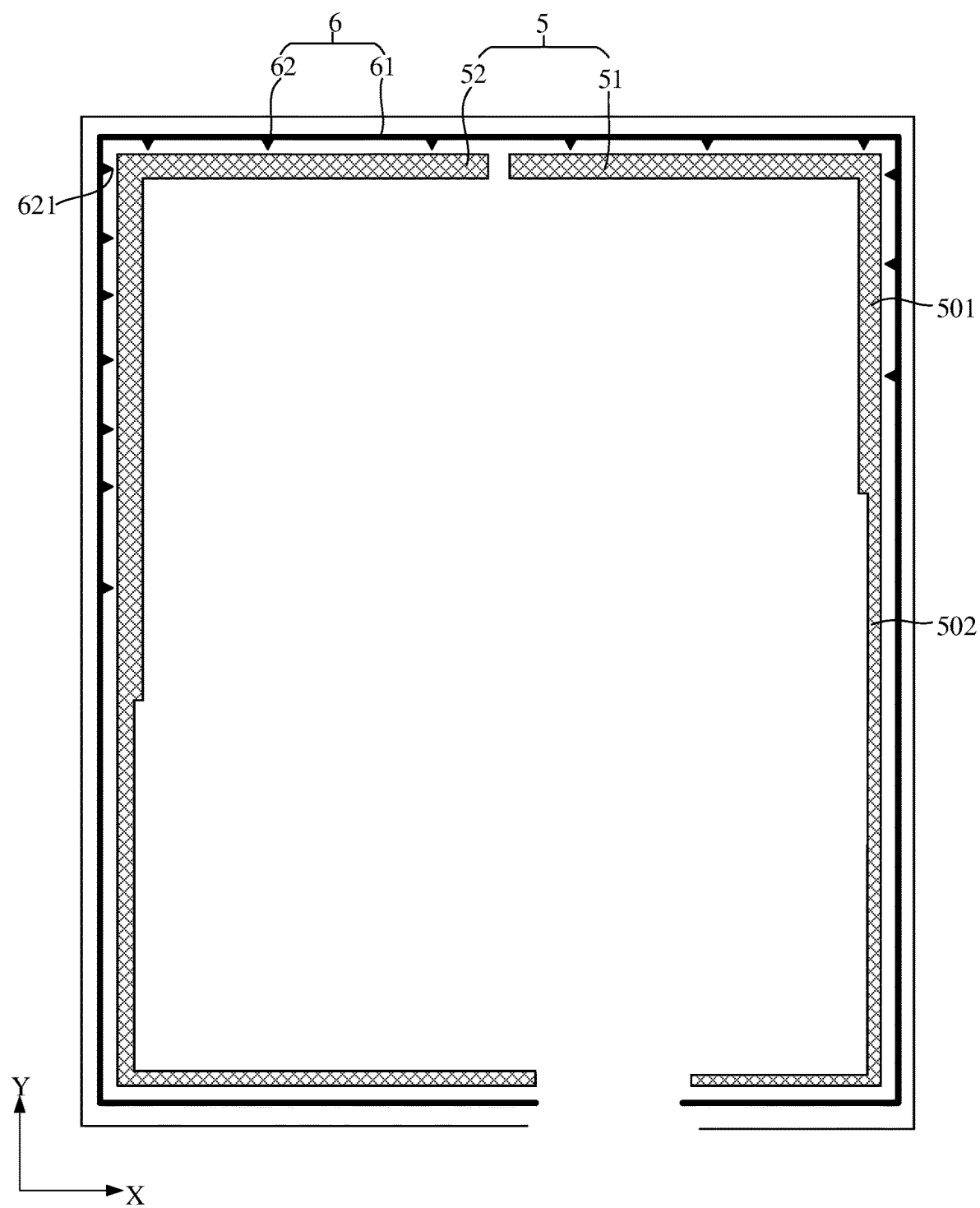
FIG. 2 is a schematic plan outline view of a touch substrate according to some embodiments of the present disclosure.
Figure 3:
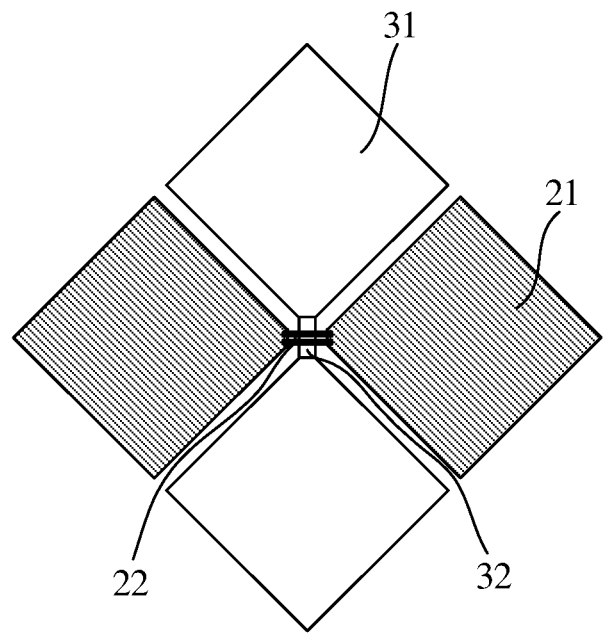
FIG. 3 is a partial enlarged view of part I in FIG. 1.
Figure 4:
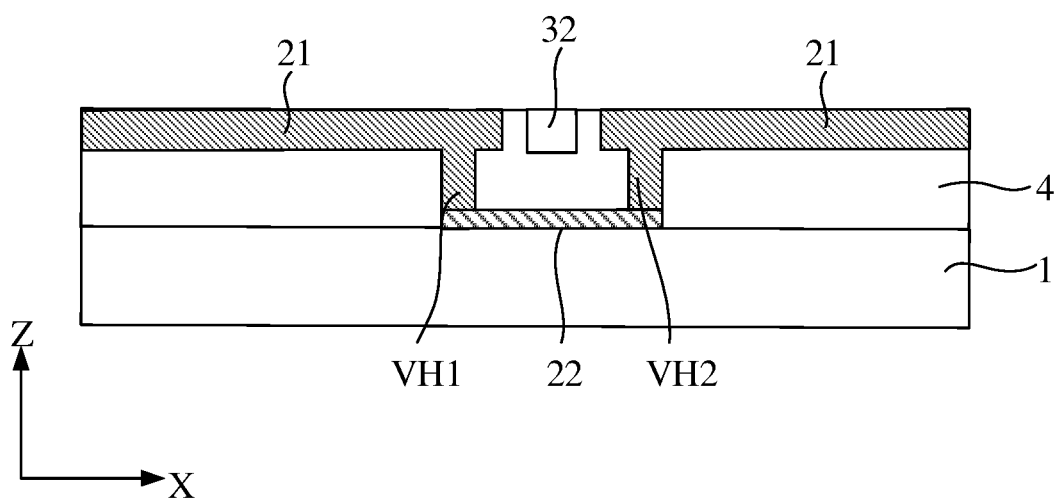
FIG. 4 is a cross-sectional view of a touch substrate according to some embodiments of the present disclosure taken along line AA' in FIG. 1.

FIG. 1 is a plan view of a touch substrate according to some embodiments of the present disclosure. FIG. 2 is a schematic plan outline view of a touch substrate according to some embodiments of the present disclosure. FIG. 3 is a partial enlarged view of part I in FIG. 1. FIG. 4 is a cross-sectional view of a touch substrate according to some embodiments of the present disclosure taken along line AA' in FIG. 1. In the following, the touch substrate provided by the embodiments of the present disclosure will be described with reference to FIGS. 1 to 4.

In the embodiments of the present disclosure, the touch substrate may include a base substrate 1. The base substrate 1 may include a touch area TA and a peripheral area NA. For example, a touch structure for implementing the touch function may be provided in the touch area TA, and various signal lines, an antistatic structure and other auxiliary elements may be disposed in the peripheral area NA.

As shown in FIG. 1, the peripheral area NA may include a pad area BA on a side of the touch area TA. For example, a plurality of pads 11 may be disposed in the pad area BA, =an end of the various signal lines may be connected to the touch structure, and the other end may be connected to the pad 11. The pad 11 is not covered by any layer, which facilitates an electrical connection to a circuit board such as a flexible printed circuit board (FPC for short). The flexible printed circuit board FPC may be electrically connected with a touch driving chip, and is configured to transmit signals from the touch driving chip. A touch signal line TL is electrically connected to the pad 11 and the touch structure, thereby implementing signal transmission between the touch structure and the flexible printed circuit board FPC.

For example, the touch control structure may adopt a mutual capacitance type structure. It should be noted that the following embodiments take the mutual capacitance structure as an example for description, however, the embodiments of the present disclosure are not limited to this, and the embodiments of the present disclosure may also adopt other types of touch structures such as a self-capacitance structure.

The touch structure may include a plurality of touch electrodes arranged in the touch area TA on the base substrate 1. The plurality of touch electrodes may include a plurality of first touch electrodes 2 and a plurality of second touch electrodes 3. For example, the first touch electrode 2 may be one of a touch driving electrode and a touch sensing electrode, and the second touch electrode 3 may be the other one of the touch driving electrode and the touch sensing electrode. In the following description, the first touch electrode 2 being the touch driving electrode is taken as an example to illustrate the embodiments of the present disclosure. It should be understood that the embodiments of the present disclosure are not limited thereto.

The first touch electrode 2 and the second touch electrode 3 are intersected, the first touch electrode 2 and the second touch electrode 3 are insulated and separated by an insulating layer at an intersection, and each first touch electrode 2 and each second touch electrode 3 are correspondingly connected to at least one touch signal line TL.

A touch capacitance is formed at the intersection of the first touch electrode 2 and the second touch electrode 3. When performing touch sensing, the touch driving chip sequentially provides a touch drive signal to the pads 11 corresponding to the plurality of first touch electrodes 2, so that each first touch electrode 2 sequentially loads the touch driving signal, and the second touch electrode 3 generates a corresponding sensing signal. When a touch occurs, a human body or a stylus get close to the touch area, the touch capacitance in the area changes, so that the sensing signal of the second touch electrode 3 at the corresponding position changes, and the touch driving chip determines a touch position according to the changed sensing signal.

In some embodiments, the first touch electrode 2 includes: a plurality of first electrode units 21 arranged in a first direction X, and a bridge portion 22 connected between every two adjacent first electrode units 21. The second touch electrode 3 includes: a plurality of second electrode units 31 arranged in a second direction Y, and a connecting portion 32 connected between every two adjacent second electrode units 31. Where the first direction X and the second direction Y are intersected.

The plurality of first electrode units 21 and the plurality of second electrode units 31 may be arranged in an array on the base substrate 1. The plurality of first electrode units 21 and the plurality of second electrode units 31 may be located in a same layer.

For example, the connecting portion 32 may be located on the same layer as the second electrode unit 31. In this way, the plurality of second electrode units 31 located in the same column may be electrically connected through the connection portion 32.

In some embodiments, the bridging portion 22 may be located on a side of a layer where the first electrode unit 21 is located close to the base substrate 1. A first insulating layer 4 is disposed between a layer where the bridge portion 22 is located and the layer where the first electrode unit 21 is located, an end of the bridge portion 22 is electrically connected to a first electrode unit 21 through a via hole VH1 penetrating the first insulating layer 4, and the other end of the bridge 22 is electrically connected to another first electrode unit 21 through a via hole VH2 penetrating the first insulating layer 4. In this way, a row of first electrode units 21 may be electrically connected through a plurality of bridge portions 22 arranged in different layers.

Figure 5:
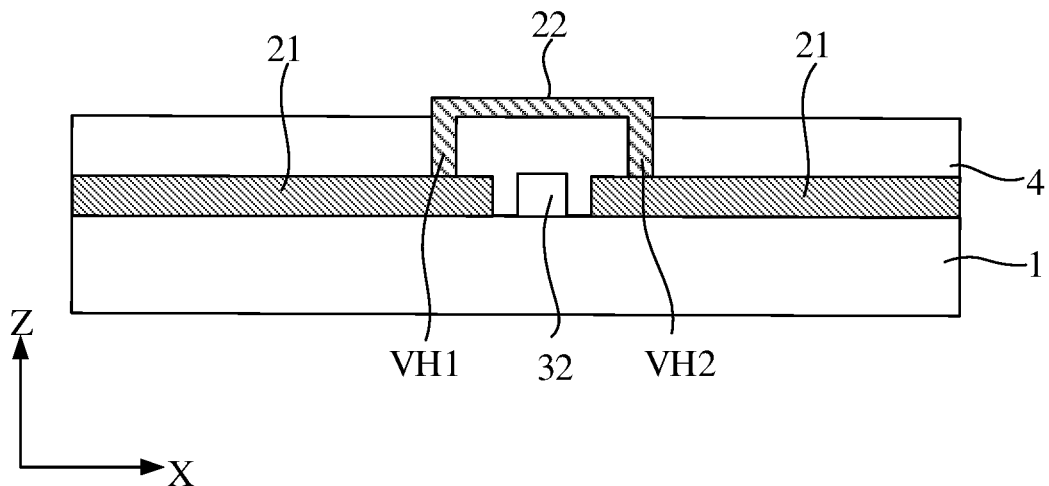
FIG. 5 is a cross-sectional view of a touch substrate according to other embodiments of the present disclosure taken along line AA' in FIG. 1.

FIG. 5 is a cross-sectional view of a touch substrate according to other embodiments of the present disclosure taken along line AA' in FIG. 1. Referring to FIG. 5, in some embodiments, a bridge portion 22 may be located on a side of a layer where the first electrode unit 21 is located away from the base substrate 1. The first insulating layer 4 is disposed between the layer where the bridge portion 22 is located and the layer where the first electrode unit 21 is located, an end of the bridge portion 22 is electrically connected to a first electrode unit 21 through a via hole VH1 penetrating the first insulating layer 4, and the other end of the bridge 22 is electrically connected to another first electrode unit 21 through a via hole VH2 penetrating the first insulating layer 4. In this way, a row of first electrode units 21 may be electrically connected by a plurality of bridge portions 22 arranged in different layers.

For example, each of the first electrode unit 21 and the second electrode unit 31 is a transparent electrode, that is, contains a transparent conductive material. Alternatively, each of the first electrode unit 21 and the second electrode unit 31 is a metal mesh electrode, that is, contains a metal material. The connecting portion 32 is made of the same material as the second electrode unit 31, and the bridge portion 22 may be made of a metal material or a transparent conductive material.

Optionally, the metal material may include metallic molybdenum Mo, metallic copper Cu, metallic aluminum Al and alloy materials thereof, and the transparent conductive material may include indium tin oxide (ITO) or indium zinc oxide (IZO).

Figure 6:
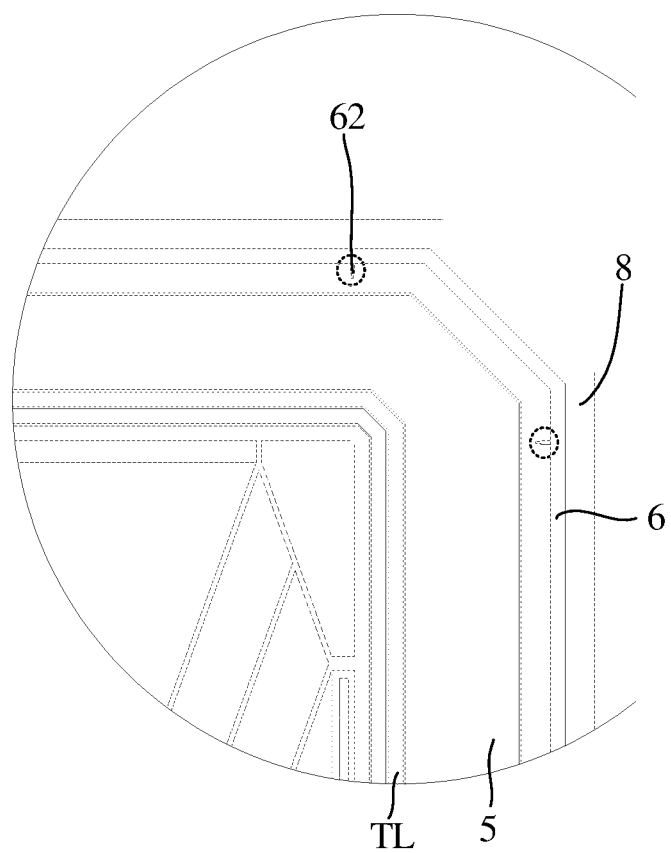
FIG. 6 is a partial enlarged view of part II in FIG. 1.
Figure 7:
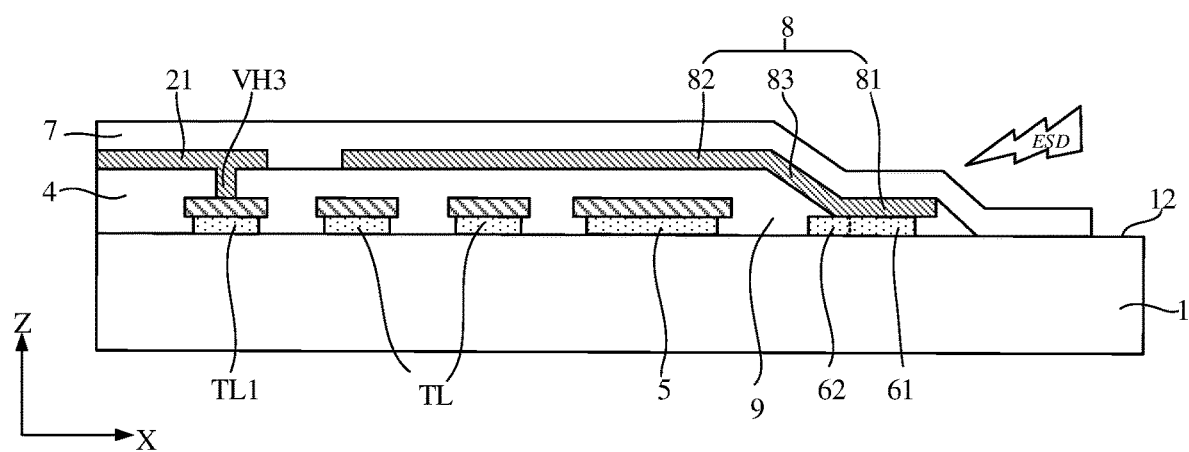
FIG. 7 is a cross-sectional view of a touch substrate according to some embodiments of the present disclosure taken along line BB' in FIG. 1.

FIG. 6 is a partial enlarged view of part II in FIG. 1, and FIG. 7 is a cross-sectional view of a touch substrate according to some embodiments of the present disclosure taken along line BB' in FIG. 1. Referring to FIGS. 1 to 7 in combination, the touch substrate further includes a plurality of touch signal lines TL arranged in the peripheral area NA on the base substrate 1, and the plurality of touch signal lines TL are electrically connected to the plurality of touch electrodes 2 and 3, respectively. For example, the touch signal line TL may include a metal conductive material.

The touch substrate may further include a ground line 5 arranged in the peripheral area NA on the base substrate 1. The ground line 5 is located on a side of the plurality of touch signal lines TL away from the touch area TA, that is, the ground line 5 is located outside the plurality of touch signal lines TL to surround the plurality of touch signal lines TL.

In some embodiments, as shown in FIG. 2, the ground line 5 forms a semi-closed structure surrounding the touch area TA. For example, the ground line 5 may include a first ground line portion 51 and a second ground line portion 52 in the peripheral area NA. An end of the first ground line portion 51 is connected to a corresponding pad 11 in the pad area BA, and the other end extends to a side of the touch area TA away from the pad area BA. An end of the second ground line portion 52 is connected to a corresponding pad 11 in the pad area BA, and the other end extends to the side of the touch area TA away from the pad area BA. The first ground line portion 51 and the second ground line portion 52 form a semi-closed structure surrounding the touch area TA, and each touch signal line TL is located between the first ground line portion 51 and the second ground line portion 52. Wherein each of the pad 11 connected to the first ground line portion 51 and the pad 11 connected to the second ground line portion 52 is configured to load a ground signal. Specifically, each of the pad 11 connected to the first ground line portion 51 and the pad 11 connected to the second ground line portion 52 is connected to a ground terminal of the touch driving chip, thereby preventing the touch structure and the touch signal line TL from external electrostatic interference or other interferences. The end of the first ground line portion 51 not connected to the pad 11 and the end of the second ground line portion 52 not connected to the pad 11 are arranged at an interval.

The ground line 5 and the touch signal line TL are located in a same layer, that is, they contain a same material (for example, both contain the metal conductive material) and are formed by a same patterning process.

For example, a width of the ground line 5 is greater than a width of the touch signal line TL.

For example, the ground line 5 may include a first portion 501 and a second portion 502, and a width of the first portion 501 is greater than a width of the second portion 502. That is, a line width of a part of the ground line 5 is greater than a line width of the other part of the ground line 5, so that a widened portion 501 is formed. In the embodiment shown in FIG. 2, each of the first ground line portion 51 and the second ground line portion 52 includes the widened portion of a certain length. As shown in FIG. 2, a part of the ground line 5 on a side away from the pad area BA (that is, an upper side) is formed as the widened portion 501, and parts of the ground line 5 on the left and right sides are formed as the widened portion 501.

In the embodiments of the present disclosure, the display substrate may further include an antistatic member 6 arranged in the peripheral area NA on the base substrate 1, and the antistatic member 6 is located on a side of the ground line 5 away from the touch area TA. That is, the antistatic member 6 is located outside the ground line 5 to surround the ground line 5.

The antistatic member 6 may form a semi-closed structure surrounding the touch area TA. At least one end of the antistatic member 6 is connected to a corresponding pad 11 in the pad area BA. For example, the antistatic member 6 may be configured to load the ground signal. However, the embodiments of the present disclosure are not limited to this, and the antistatic member 6 may also be suspended.

The antistatic member 6 may be located on the same layer as the ground line 5, that is, the antistatic member 6 and the ground line 5 contain the same material (for example, both contain the metal conductive material) and are formed by the same patterning process. In the embodiments of the present disclosure, the antistatic member 6, the ground line 5 and the touch signal line TL are all located on the same layer, they may be disposed in sequence in a direction from the peripheral area NA to the touch area TA (that is, the direction from outside to inside), and they may be arranged at an interval from each other.

For example, the line width of the ground line 5 may also be greater than a line width of the antistatic member 6.

In the embodiments of the present disclosure, the antistatic member 6 may include a member body 61 and at least one electrostatic discharge portion 62. The electrostatic discharge portion 62 extends from the member body 61 toward the ground line 5, an end of the electrostatic discharge portion 62 facing the ground line 5 is formed as a tip 621, and the tip 621 and the ground line 5 are arranged at an interval.

For example, a minimum interval distance between the tip 621 and the ground line 5 is greater than 5 microns.

Figure 8A:
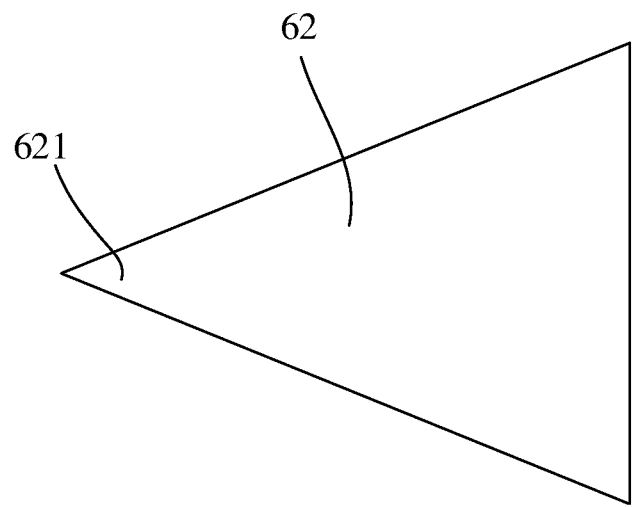
FIGS. 8A and 8B schematically illustrate a shape of an electrostatic discharge portion included in an antistatic member, respectively.
Figure 8B:
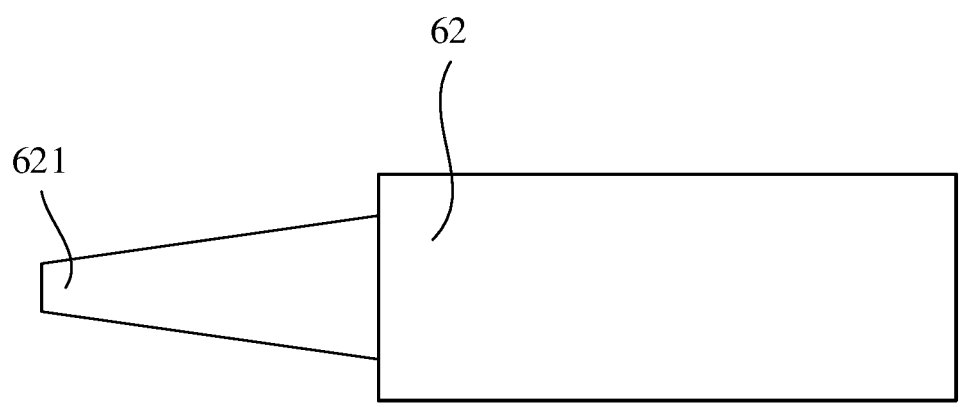

FIGS. 8A and 8B schematically illustrate a shape of an electrostatic discharge portion included in an antistatic member, respectively. Referring to FIGS. 8A and 8B, the electrostatic discharge portion 62 may have a triangular shape or a spindle shape. It should be understood that the electrostatic discharge portion of the embodiments of the present disclosure is not limited to these shapes. As long as the end of the electrostatic discharge portion facing the ground line is formed as a relatively thin tip in order to guide the discharge of static electricity from the tip, this type of electrostatic discharge portion belongs to the embodiments of the present disclosure.

For example, the electrostatic discharge portion 62 may directly extend from the member body 61, that is, the electrostatic discharge portion 62 and the member body 61 are formed by the same patterning process.

In the embodiments of the present disclosure, the electrostatic discharge portion 62 is disposed opposite to the first portion 501 of the ground line 5, that is, the tip of the electrostatic discharge portion 62 is disposed opposite to the widened portion 501 of the ground line 5. With such an arrangement, when static electricity is discharged to the ground line 5 through the tip of the electrostatic discharge portion 62, it may be discharged to the widened first portion 501 of the ground line. In this way, excessive electrostatic breaking down the ground line may be avoided, so that the internal touch signal lines may be better protected.

In the embodiments of the present disclosure, the touch substrate may further include an electrostatic protection component 8 arranged in the peripheral area NA on the base substrate 1. An end of the electrostatic protection component 8 away from the touch area TA is in contact with the antistatic member 6. That is, the electrostatic protection component 8 and the antistatic member 6 are electrically connected.

An orthographic projection of the electrostatic protection component 8 on the base substrate 1 covers an orthographic projection of each of the antistatic member 6 and the ground line 5 on the base substrate 1. The orthographic projection of the electrostatic protection component 8 on the base substrate 1 also covers an orthographic projection of at least a part of the plurality of touch signal lines TL on the base substrate 1. In this way, the electrostatic protection component 8 forms a covering structure covering the antistatic member 6, the ground line 5 and at least a part of the touch signal line TL.

In the embodiments of the present disclosure, static electricity may be directly conducted to the electrostatic protection component 8 and then to the antistatic member 6 that overlaps the electrostatic protection component 8, so that a part of the static electricity is released. Further, when the electrostatic voltage is too high, for example, when the electrostatic voltage is greater than 15 KV, or even when the electrostatic voltage is greater than 20 KV, static electricity may be quickly released to the ground line 5 through the antistatic member 6, so that the static electricity may be released through the ground line. In this way, it may be ensured that static electricity will not be released to the internal signal lines such as the touch signal line, so that the influence of static electricity on normal touch or display functions may be avoided.

Referring to FIG. 7, the electrostatic protection component 8 and the first touch electrode 2 may be located in the same layer. That is, the electrostatic protection component 8 and the first touch electrode 2 may include the same material, such as the transparent conductive material as ITO, and may be formed by the same patterning process.

Figure 9:
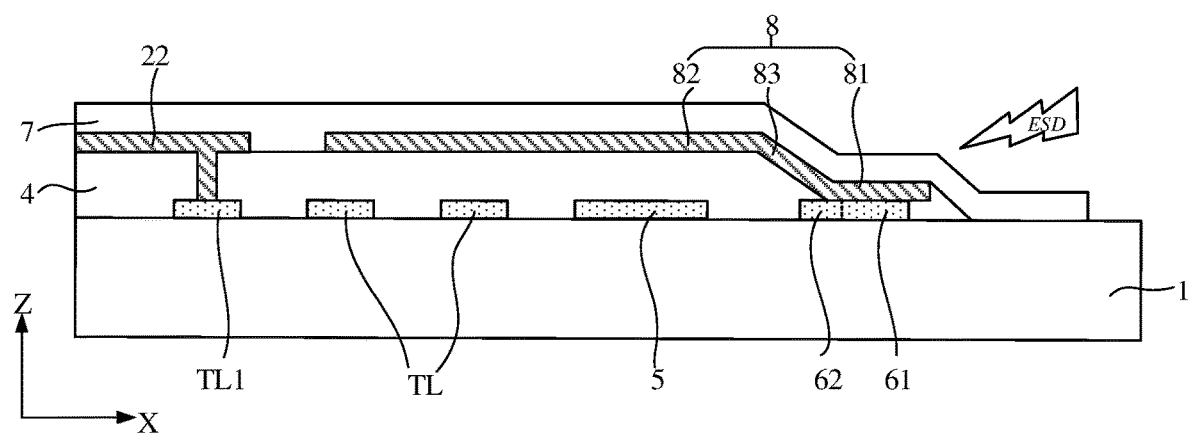
FIG. 9 is a cross-sectional view of a touch substrate according to other embodiments of the present disclosure taken along the line BB' in FIG. 1.

It should be noted that, the embodiment shown in FIG. 7 is aimed at the situation shown in FIG. 4, that is, the touch unit is on the upper side and the bridge portion is on the lower side. However, the embodiments of the present disclosure are not limited to this. FIG. 9 is a cross-sectional view of a touch substrate according to other embodiments of the present disclosure taken along line BB' in FIG. 1. Referring to FIG. 9, an electrostatic protection component 8 and the bridge portion 22 may be located in the same layer. That is, the electrostatic protection component 8 and the bridge portion 22 may contain the same material, such as the transparent conductive material such as ITO or the metal material, and may be formed by the same patterning process. For example, the embodiment shown in FIG. 9 is for the situation shown in FIG. 5, that is, the touch unit is on the lower side and the bridge is on the upper side.

That is, in the embodiments of the present disclosure, the electrostatic protection component 8 and the conductive layer on the uppermost layer are located in the same layer. In this way, the electrostatic protection component 8 may cover all the conductive layers below, so as to protect these conductive layers from static electricity.

Referring back to FIG. 7, the above-mentioned first insulating layer 4 also extends to the peripheral area NA. That is, the first insulating layer 4 is arranged between the electrostatic protection component 8 and each of the ground line 5 and the plurality of touch signal lines TL. In this way, the first insulating layer 4 insulates and separates each of the ground line 5 and the plurality of touch signal lines TL from the electrostatic protection component 8.

The first insulating layer 4 is located between a layer where the plurality of touch signal lines TL are located and a layer where the plurality of touch electrodes 2 are located. The plurality of touch signal lines TL include a first touch signal line TL1 closest to the touch area TA, and the touch electrode 2 is electrically connected to the first touch signal line TL1 through a via hole VH3 penetrating the first insulating layer 4. That is, the first touch signal line TL1 is an innermost touch signal line among the plurality of touch signal lines TL.

In some embodiments, the orthographic projection of the electrostatic protection component 8 on the base substrate 1 and an orthographic projection of the first touch signal line TL1 on the base substrate 1 are arranged at an interval. That is, the orthographic projection of the electrostatic protection component 8 on the base substrate 1 does not overlap with the orthographic projection of the first touch signal line TL1 on the base substrate 1.

Referring to FIG. 7, an end of the electrostatic protection component 8 close to the first electrode unit 21 and the first electrode unit 21 closest to the peripheral area are arranged at an interval. For example, a minimum distance between the end of the electrostatic protection component 8 close to the first electrode unit 21 and the first electrode unit 21 closest to the peripheral area is greater than 20 microns. In this way, it may be ensured that the electrostatic protection component 8 will not overlap the first electrode unit 21, so that it may be ensured that static electricity will not be directly discharged to the touch electrode through the electrostatic protection component 8.

Referring to FIG. 9, an end of the electrostatic protection component 8 close to the bridge portion 22 and the bridge portion 22 closest to the peripheral area are arranged at an interval. For example, a minimum distance between the end of the electrostatic protection component 8 close to the bridge portion 22 and the bridge portion 22 closest to the peripheral area is greater than 20 microns. In this way, it may be ensured that the electrostatic protection component 8 will not overlap with the bridging portion 22, so that it may be ensured that static electricity will not be directly discharged to the touch electrode through the electrostatic protection component 8.

In the embodiments of the present disclosure, the electrostatic protection component 8 includes a first protection portion 81, a second protection portion 82 and a third protection portion 83. An orthographic projection of the first protection portion 81 on the base substrate 1 covers an orthographic projection of the antistatic member 6 on the base substrate 1, an orthographic projection of the second protection portion 82 on the base substrate 1 covers an orthographic projection of the ground line 5 on the base substrate 1, and the third protection portion 83 connects the first protection portion 81 with the second protection portion 82. Referring to FIG. 7, the first protection portion 81 is a first flat portion, the second protection portion 82 is a second flat portion, and the third protection portion 83 is an inclined portion.

The base substrate 1 includes a first surface 12 facing the ground line 5 (i.e, an upper surface in FIG. 7). A vertical distance between a surface of the first protection portion 81 close to the base substrate and the first surface 12 is less than a vertical distance between a surface of the second protection portion 82 close to the base substrate and the first surface 12. That is, the first protection portion 81 is at a lower position, and the second protection part 82 is at a higher position. The third protection portion 83 extends obliquely with respect to the first surface 12. With such an arrangement, the electrostatic protection component 8 may better cover the ground line and the touch signal line.

For example, the touch substrate may further include a second insulating layer 7 on a side of the electrostatic protection component 8 away from the base substrate 1, the second insulating layer 7 and the base substrate 1 surround to form an accommodation space 9, and each of the electrostatic protection component 8, the antistatic member 6 and the ground line 5 is located in the accommodation space 9.

For example, materials of the first insulating layer 4 and the second insulating layer 7 may include an inorganic material such as silicon oxide, silicon nitride, and/or silicon oxynitride, and may be formed as a multilayer or a single layer.

For example, referring back to FIG. 7, in some embodiments of the present disclosure, an auxiliary conductive portion may be formed on a surface of the touch signal line TL and the ground line 5 away from the base substrate 1. For example, the auxiliary conductive portion and the bridge portion 22 may be located in the same layer, that is, made of the transparent conductive material such as ITO. In this way, the conductivity of the touch signal line and the ground line may be improved. However, the embodiments of the present disclosure are not limited to this, and in other embodiments, the auxiliary conductive portion may not be provided.

In the touch substrate provided by the embodiments of the present disclosure, it may be ensured that static electricity will not be released to internal signal lines such as the touch signal lines, so that the influence of static electricity on normal touch or display functions may be avoided.

Although some embodiments of the general inventive concept of the present disclosure have been illustrated and described, those skilled in the art should understand that, the embodiments may be changed without departing from the principle and spirit of the general inventive concept of the present disclosure, and the scope of the present disclosure is defined by the claims and their equivalents.

What is claimed is:

1. A touch substrate, wherein the touch substrate comprises:
    a base substrate comprising a touch area and a peripheral area surrounding the touch area;
    a plurality of touch electrodes arranged in the touch area on the base substrate;
    a plurality of touch signal lines arranged in the peripheral area on the base substrate, the plurality of touch signal lines are respectively electrically connected to the plurality of touch electrodes;
    a ground line arranged in the peripheral area on the base substrate, the ground line is located on a side of the plurality of touch signal lines away from the touch area;
    an antistatic member arranged in the peripheral area on the base substrate, the antistatic member is located on a side of the ground line away from the touch area; and
    an electrostatic protection component arranged in the peripheral area on the base substrate,
    wherein an end of the electrostatic protection component away from the touch area is in contact with the antistatic member, and an orthographic projection of the electrostatic protection component on the base substrate covers an orthographic projection of each of the antistatic member and the ground line on the base substrate.

2. The touch substrate of claim 1, wherein the orthographic projection of the electrostatic protection component on the base substrate further covers an orthographic projection of at least a part of the plurality of touch signal lines on the base substrate.

3. The touch substrate of claim 2, wherein an insulating layer is arranged between the electrostatic protection component and each of the ground line and the plurality of touch signal lines.

4. The touch substrate of claim 1, wherein the ground line and the antistatic member contain a same material and are located in a same layer, and the ground line and the antistatic member are arranged at an interval.

5. The touch substrate of claim 4, wherein the antistatic member comprises a member body and at least one electrostatic discharge portion, the electrostatic discharge portion extends from the member body toward the ground line, an end of the electrostatic discharge portion facing the ground line is a tip, and the tip and the ground line are arranged at an interval.

6. The touch substrate of claim 5, wherein the ground line comprises a first portion and a second portion, a width of the first portion is greater than a width of the second portion; and the at least one electrostatic discharge portion is arranged opposite to the first portion of the ground line.

7. The touch substrate of claim 1, wherein the ground line and the plurality of touch signal lines contain a same material and are located in a same layer, and the ground line and the plurality of touch signal lines are arranged at an interval.

8. The touch substrate of claim 1, wherein the touch substrate comprises a first insulating layer, the first insulating layer is located between a layer where the plurality of touch signal lines are located and a layer where the plurality of touch electrodes are located;
wherein the plurality of touch signal lines comprises a first touch signal line closest to the touch area, and the touch electrode is electrically connected to the first touch signal line through a via hole penetrating the first insulating layer; and
wherein the orthographic projection of the electrostatic protection component on the base substrate and an orthographic projection of the first touch signal line on the base substrate are arranged at an interval.

9. The touch substrate of claim 8, wherein the plurality of touch electrodes comprises a plurality of first touch electrodes and a plurality of second touch electrodes,
the first touch electrode comprises: a plurality of first electrode units arranged in a first direction, and a bridge portion connected between every two adjacent first electrode units;
a second touch electrode comprises: a plurality of second electrode units arranged in a second direction, and a connecting portion connected between every two adjacent second electrode units,
wherein the first direction and the second direction intersect, and the first electrode units, the second electrode units and the connecting portions are located in a same layer.

10. The touch substrate of claim 9, wherein the bridge portion is located on a side of a layer where the first electrode units are located close to the base substrate; and
the electrostatic protection component and the plurality of first touch electrodes contain a same material and are located in a same layer, and an end of the electrostatic protection component close to the first touch electrodes and a first touch electrode closest to the peripheral area are arranged at an interval.

11. The touch substrate of claim 9, wherein the bridge portion is located on a side of a layer where the first electrode units are located away from the base substrate; and
the electrostatic protection component and the bridge portion contain a same material and are located in a same layer, and an end of the electrostatic protection component close to the bridge portion and a bridge portion closest to the peripheral area are arranged at an interval.

12. The touch substrate of claim 1, wherein the electrostatic protection component comprises a first protection portion, a second protection portion and a third protection portion, an orthographic projection of the first protection portion on the base substrate covers an orthographic projection of the antistatic member on the base substrate, an orthographic projection of the second protection portion on the base substrate covers the orthographic projection of the ground line on the base substrate, and the third protection portion is configured to connect the first protection portion with the second protection portion; and
wherein the base substrate comprises a first surface facing the ground line, a vertical distance between a surface of the first protection portion close to the base substrate and the first surface is less than a vertical distance between a surface of the second protection portion close to the base substrate and the first surface, and the third protection portion extends obliquely with respect to the first surface.

13. The touch substrate of claim 12, wherein the touch substrate further comprises a second insulating layer on a side of the electrostatic protection component away from the base substrate, the second insulating layer and the base substrate surround to form an accommodating space, and each of the electrostatic protection component, the antistatic member and the ground line is located in the accommodation space.

14. The touch substrate of claim 5, wherein a minimum interval distance between the tip and the ground line is greater than 5 microns; or
a minimum distance between an end of the electrostatic protection component close to a first touch electrode and the first touch electrode is greater than 20 microns.

15. The touch substrate of claim 1, wherein the ground line and the antistatic member contain a metal material; or
the electrostatic protection component contains a transparent conductive material.

16. The touch substrate of claim 1, wherein the antistatic member forms a semi-closed structure surrounding the touch area; or
the ground line forms a semi-closed structure surrounding the touch area.

17. The touch substrate of claim 1, wherein the antistatic member is configured to load a ground signal or be suspended; or
the ground line is configured to load a ground signal.

18. A touch display device, wherein the touch display device comprises the touch substrate of claim 1.

19. The touch substrate of claim 2, wherein the ground line and the antistatic member contain a same material and are located in a same layer, and the ground line and the antistatic member are arranged at an interval.

20. The touch substrate of claim 3, wherein the ground line and the antistatic member contain a same material and are located in a same layer, and the ground line and the antistatic member are arranged at an interval.

* * * * *